Sept. 9, 1969   O. N. LAWRENCE   3,465,643
DEVICES FOR TRANSLATING FORCES
Filed July 5, 1967   2 Sheets-Sheet 1
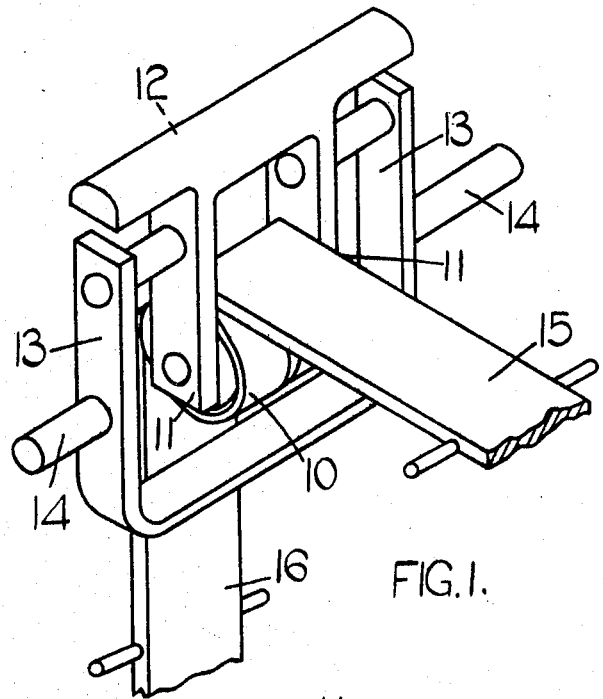
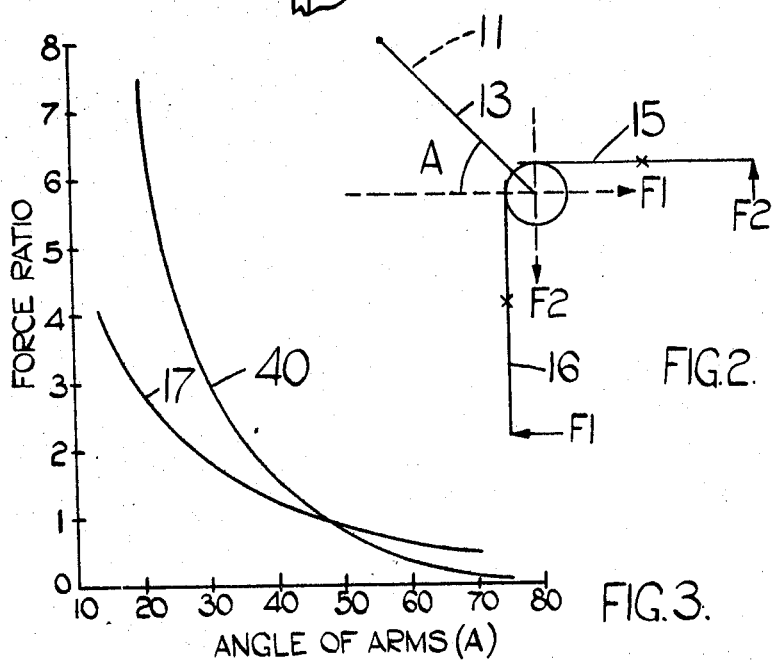

Sept. 9, 1969  O. N. LAWRENCE  3,465,643
DEVICES FOR TRANSLATING FORCES
Filed July 5, 1967  2 Sheets-Sheet 2

United States Patent Office 3,465,643
Patented Sept. 9, 1969

3,465,643
DEVICES FOR TRANSLATING FORCES
Owen Napier Lawrence, Wimbledon, London, England, assignor to Joseph Lucas (Industries) Limited, Birmingham, England, a British company
Filed July 5, 1967, Ser. No. 651,171
Int. Cl. F15b 13/02, 9/10
U.S. Cl. 91—47                          7 Claims

ABSTRACT OF THE DISCLOSURE

A force translating device comprising a first lever acting upon a first element, a second lever acting upon a second element, the two elements being mounted upon a fixed body through respective pairs of arms, a connecting lever pivotally mounted on the body and bearing at its ends upon the elements, the arms also being connected together by an axle.

---

This invention relates to a device for translating forces and including a mechanism of the kind comprising in combination, an element, a pair of pivotally connected arms for mounting said element on a fixed body, one of said arms being pivotally connected to said element about a first axis which is parallel to but spaced from the common pivot axis of the two arms, and the other arm being pivotally connected to the body about a second axis which is parallel to and is spaced from the common axis by the same distance as the spacing of the first axis from the common axis, the element and arms being movable to a position in which the first and second axes are coincident, in which position the mechanism is said to be in equilibrium, and a pair of levers through which forces can act upon the element, the forces acting upon the element at right angles when the mechanism is in equilibrium.

The object of the invention is to provide such a device in a simple and convenient form.

According to the invention a device for translating forces comprises a pair of mechanisms of the kind specified the two mechanisms having their said other arms connected together so as to be angularly movable together, and one of the levers of each pair of levers being constituted by a single transfer lever pivotally mounted intermediate its ends on said body.

Figure 4:
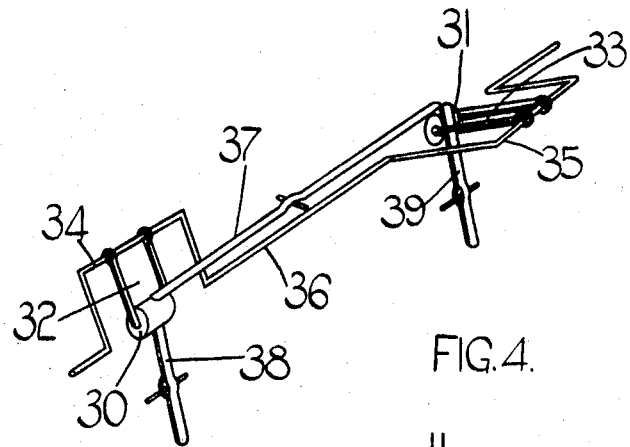
Figure 5:
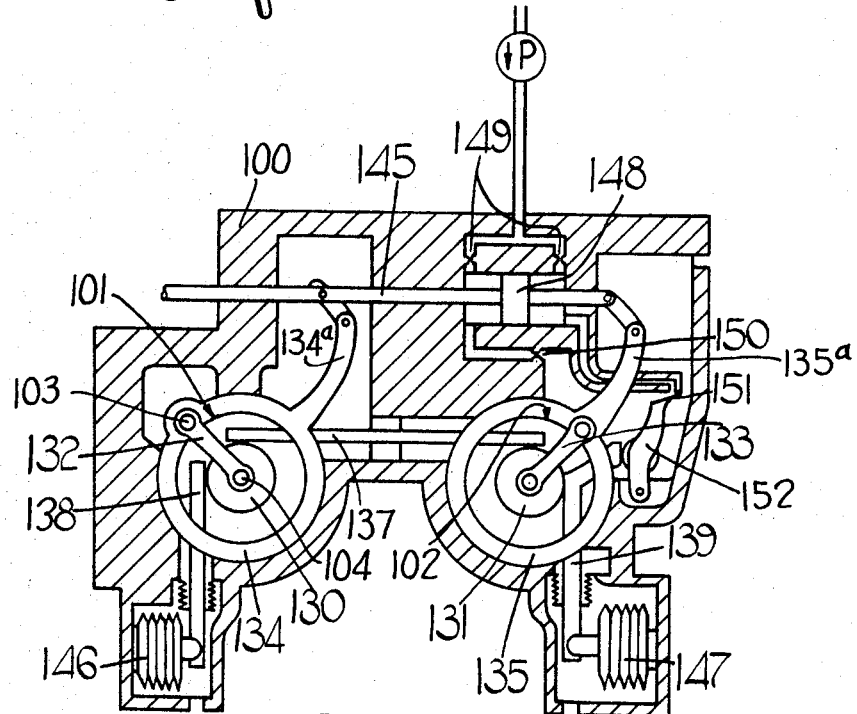

In the accompanying drawings:
FIGURE 1 is a perspective view of the simple device,
FIGURE 2 is a force diagram of the simple device,
FIGURE 3 is a graph bearing two curves showing the relationship between force ratio and the angle of the arms for the simple device and also the device in accordance with the invention,
FIGURE 4 is a diagrammatic layout of the device in accordance with the invention, and
FIGURE 5 is a side elevation of a practical form of the device shown in FIGURE 4.

With reference to FIGURES 1, 2 and 3 of the drawings the simple device comprises a mechanism including a roller 10 which is pivotally mounted about a first pivot axis upon a first arm in the form of a pair of spaced and interconnected limbs 11 which at their ends remote from the roller are provided with a balance weight 12. The first arm is pivotally connected to a second arm comprising a pair of spaced limbs 13, the common pivot axis of the arms being parallel to but spaced from, the pivot axis of the roller and the first arm. The second arm is pivotally mounted about a second pivot axis upon a fixed body (not shown) by means of a pair of axles 14 which extend from the limbs 13 respectively. The second pivot axis is parallel to and spaced from the common pivot axis by a distance equal to the spacing of the first pivot axis from the common pivot axis.

Also provided is a pair of levers 15, 16 which are pivotally mounted intermediate their ends upon the aforesaid body. The levers are disposed at 90° relative to each other and the adjacent ends of the levers bear upon the roller 10. Forces applied to the remote ends of the levers will be transmitted to the roller and will act thereon at right angles relative to each other. If the two forces are equal the mechanism by rotation of the axle, can be made to assume a position of equilibrium in which the angle of the arms (indicated at A in FIGURE 2) is 45°. Moreover, in the equilibrium position the first and second axes are coincident with each other.

If the two forces applied to the roller are not equal the roller will be displaced and the arms must be adjusted by angular movement of the axles to bring the mechanism back into the equilibrium position. Thus the angle A of the arms at the equilibrium position is an indication of the ratio of the two forces applied to the roller. If the angle A is plotted against the ratio of the forces in the form $$\frac{1}{K} \cdot \frac{F_2}{F_1}$$

then curve 17 is obtained in FIGURE 3. It has been found that the device is usable only between angles of 20° and 70° and the corresponding range of force ratios is approximately 7.5:1, the 20° position corresponding to a force ratio of 2.75 and the 70° position to a ratio of 0.36.

The device now to be described provides an extended range of force ratios and will be described initially with reference to FIGURE 4.

As shown in FIGURE 4 the force translating device comprises a pair of mechanisms as previously described which are interconnected together. The device comprises a pair of rollers 30, 31 which are pivotally mounted respectively on first arms 32 and 33. The first arms 32 and 33 are mounted upon second arms 34, 35 respectively and these are provided with a common axle 36 mounted within a body. Moreover, the arms 34 and 35 are disposed at right angles relative to each other. Acting upon the rollers 30 and 31 respectively are levers 38 and 39 which are pivotally mounted in the body and through which forces may be applied to the rollers. Furthermore a common lever 37 is provided which is pivotally mounted intermediate its ends and which has its opposite ends bearing upon the rollers. The spacing of the axes of the rollers and first and second arms is as in the mechanism first described the mode of operation is the same, forces being transmitted between the two mechanisms by the lever 37 and the axle 36.

If the angle A is plotted against the force ratio (as previously defined) the curve reference 40 in FIGURE 3 is obtained. With this device the force ratio at 20° is 7.5 and at 70° it is 0.13 giving a range of 57:1.

The practical embodiment of the invention shown in FIGURE 5 includes a body 100 whereby two mechanisms 101, 102 identical in principle to the mechanisms of FIGURE 1 are supported. The mechanism 101 comprises an element 130 in the form of a roller which is pivotally mounted on a first arm 132 on an axis 103. The opposite end of the first arm 132 is pivotally supported by an annular second arm means on an axis 104 which is spaced from and parallel to the axis of the roller 130. The length of the arm 132 is such that the spacing of the axes 103, 104 is equal to the spacing of the axis 103 from the central axis of the annular second arm means 134. The annular second arm means 134 is supported in the body 100 in a recess therein having part cylindrical walls such that the external periphery of the annular arm means 134 engages said walls. The annular second arm means 134 is thereby restrained to move pivotally about its central axis.

The second mechanism 102 is substantially identical to the mechanism 101, comprising a roller element 131, a first arm 133, and an annular second arm means 135. The axes of the second arm means 134, 135 are spaced and parallel.

The second arm means 134, 135 are provided with horns 134a, 135a which are interconnected by a rod 145 such that the two second arm means 134, 135 always move simultaneously through identical angular displacements. The rod 145 thus corresponds exactly in function to the axle 36 of FIGURE 4.

A lever 137, corresponding to the lever 37 of FIGURE 4, is pivotally mounted intermediate its ends on the body and its opposite ends engage the roller elements 130, 131, respectively. It will be appreciated from inspection of the drawing that upward movement of the roller 130 will be transmitted via the lever 137 to cause an equal downward movement of the roller 131 which is exactly what occurs in the arrangement of FIGURE 4. Similarly, upward movement of roller 131 causes downward movement of roller 130.

Levers 138, 139 pivoted to the body are arranged to act on rollers 130, 131, respectively. Clockwise turning of lever 138 causes displacement of the roller 130 to the right as shown in FIGURE 5, and owing to the connection of arm 132 to the arm means 134 this causes swinging of arm 134 in an anticlockwise direction thereby raising roller 130. The consequent downward movement of roller 131 causes clockwise angular displacement of lever 139. Similarly, anticlockwise movement of lever 139 displaces to the left and raises roller 131, lowers and displaces to the right roller 130 and turns lever 138 in anticlockwise direction.

The levers 138, 139 are connected respectively by fluid pressure sensitive capsules 146, 147. The capsules are sensitive to two different fluid pressures and the capsules exert forces on their respective levers dependent on the magnitudes of these pressures.

In order to maintain the device in the equilibrium position shown (when the axis of the rollers 130, 131 coincide respectively with the central axes of the two second arm means 134, 135) there is provided a servo-motor for turning the second arm means 134, 135 by longitudinal displacement of the rod 145. This motor comprises a piston 148 on the rod 145 and slidable in a cylinder defined in the body. Fluid under pressure is supplied to the opposite ends of the cylinder via a pair of flow restrictors 149 and flows from one end of the cylinder via a restrictor 150 and from the other end of the cylinder via a variable restrictor 151. The variable restrictor is constituted by an orifice with which there co-acts a blade 152 movable by the lever 139.

In the equilibrium condition the constant pressure in said one end of the cylinder generated by the constant fluid flow through one restrictor 149 and the fixed restrictor 150 will not differ from the pressure in the other end of the cylinder generated by flow of fluid through the other restrictor 149 and the variable restrictor 151, i.e. the position of the blade 152 when the device is in its equilibrium condition will be such that it covers a proportion of the area of the coacting orifice to render the orifice equal in area to the restrictor 150 (assuming restrictors 149 to be equal). Should the fluid pressures on the capsules 146, 147 change so that the device is thrown out of equilibrium the blade 152 will be swung to cover or uncover the orifice. In the former case, which occurs on clockwise movement of the lever 139, the pressure in said other end of the cylinder will rise moving the rod 145 to the left and turning the second arm means 134, 135 in anticlockwise direction. This causes turning of the levers 138, 139 in anticlockwise direction thereby causing progressive uncovering of the orifice by the blade 152 until equilibrium is restored.

Similarly, a disturbance of the equilibrium of the device which causes uncovering of the orifice by the blade 152 will cause movement of the rod 145 to the right until equilibrium is restored.

For each value of the ratio of the forces transmitted by the levers 138, 139 (i.e. for each value of the pressure ratio) there will be a different equilibrium position of the rod 145. The position of the rod 145 thus provides an indication of the pressure ratio.

Having thus described my invention what I claim as new and desire to secure by Letters Patent is:

1. A device for translating forces comprising in combination:
   a body;
   a pair of mechanisms mounted on the body;
   each mechanism comprising an element, first arm means pivotally supporting said element on a first axis, second arm means pivotally connected to said first arm means on a second axis spaced from and parallel to said first axis, said second arm means being pivotally mounted on the body on a third axis parallel to said second axis and spaced therefrom by a distance equal to the spacing of the first and second axes;
   means coupling the second arm means of the two mechanisms for simultaneous identical pivotal movement;
   a lever pivotally mounted on the body intermediate its ends and having its ends bearing on the elements of the mechanisms respectively; and
   two levers acting upon the elements respectively through which forces can be transmitted to the mechanisms respectively;
   the angular positions of the second arm means being adjustable to bring the first and third axes of each mechanism simultaneously into alignment in a position in which the device is in equilibrium, the equilibrium positions of said second arm means providing an indication of the ratio of the forces applied to the mechanisms through said two levers respectively.

2. A device as claimed in claim 1 in which the third axes of the two mechanisms are coincident, said coupling means comprising an axle secured at its ends to the two second means respectively.

3. A device as claimed in claim 1 in which the third axes of the two arms are arranged in spaced parallel relationship, said coupling means comprising a longitudinally displaceable rod pivotally connected at its ends to the second arm means respectively.

4. A device as claimed in claim 3 further comprising means sensitive to the position of one of the levers for longitudinally displacing said rod to maintain the device in equilibrium as the forces exerted by said levers vary.

5. A device as claimed in claim 4 in which said means for longitudinally displacing said rod comprises a fluid pressure operable piston and cylinder combination operatively connected to said rod and valve means operable by said one of the levers and controlling the supply of fluid pressure to said piston and cylinder combination.

6. A device as claimed in claim 5 further comprising a pair of fluid pressure sensitive capsules for transmitting forces to said two levers respectively.

7. A device as claimed in claim 3 in which said second arm means of each mechanism is of annular form mounted for angular movement within said body upon its external periphery.

References Cited

UNITED STATES PATENTS

| | | | |
|---|---|---|---|
| 3,106,094 | 10/1963 | Gallo | 91—47 |
| 3,171,330 | 3/1965 | McCombs | 91—388 |
| 3,393,606 | 7/1968 | Magnani et al. | 91—47 |

PAUL E. MASLOUSKY, Primary Examiner

U.S. Cl. X.R.

74—96; 91—384